United States Patent
Brady

(10) Patent No.: US 8,155,486 B2
(45) Date of Patent: Apr. 10, 2012

(54) FLEXURAL DISC FIBER OPTIC SENSOR AND METHOD OF FORMING SAME

(75) Inventor: Dominic Brady, Freemantle (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 450 days.

(21) Appl. No.: 12/375,020

(22) PCT Filed: Jul. 12, 2007

(86) PCT No.: PCT/GB2007/002610
§ 371 (c)(1),
(2), (4) Date: May 21, 2009

(87) PCT Pub. No.: WO2008/012500
PCT Pub. Date: Jan. 31, 2008

(65) Prior Publication Data
US 2010/0061677 A1    Mar. 11, 2010

(30) Foreign Application Priority Data
Jul. 25, 2006 (GB) .................................. 0614717.7

(51) Int. Cl.
*G01P 15/00* (2006.01)
*G01P 15/093* (2006.01)
*G02B 6/00* (2006.01)
*G01B 9/02* (2006.01)

(52) U.S. Cl. ........... 385/12; 385/13; 73/491; 73/514.38; 356/477

(58) Field of Classification Search .................. None
See application file for complete search history.

(56) References Cited

U.S. PATENT DOCUMENTS

| 4,064,763 | A | 12/1977 | Srinivasan |
| 4,891,985 | A | 1/1990 | Glenn |
| 5,369,485 | A * | 11/1994 | Hofler et al. ................... 356/477 |
| 5,542,295 | A | 8/1996 | Howe et al. |
| 6,650,418 | B2 * | 11/2003 | Tweedy et al. ................ 356/477 |
| 2002/0011112 | A1 | 1/2002 | Kipp et al. |
| 2004/0237648 | A1 * | 12/2004 | Jones et al. ................ 73/514.26 |

FOREIGN PATENT DOCUMENTS

DE   10038761 A1   2/2002

* cited by examiner

*Primary Examiner* — Michelle R Connelly Cushwa

(57) ABSTRACT

A fiber optic sensor employs at least two flexural discs that are spaced apart from one another along a central axis. A fiber optic coil is affixed to at least one of the flexural discs. A proof mass is disposed between the flexural discs. A first stop member is disposed between the proof mass and one flexural disc. A second stop member is disposed between the proof mass and the other flexural disc. The first and second stop members are sized to provide space between the proof mass and the corresponding flexural disc to allow for normal motion of the flexural discs, while interfering with movement of the flexural discs to prohibit unwanted extreme motion. The fiber optic sensor can be used for OTDR measurements of acceleration for real-time oilfield monitoring applications as well as other fiber-based interferometric measurement applications. A coupling structure preferably couples the outer edges of the flexible disks, the mass being attached to the coupling structure.

21 Claims, 1 Drawing Sheet

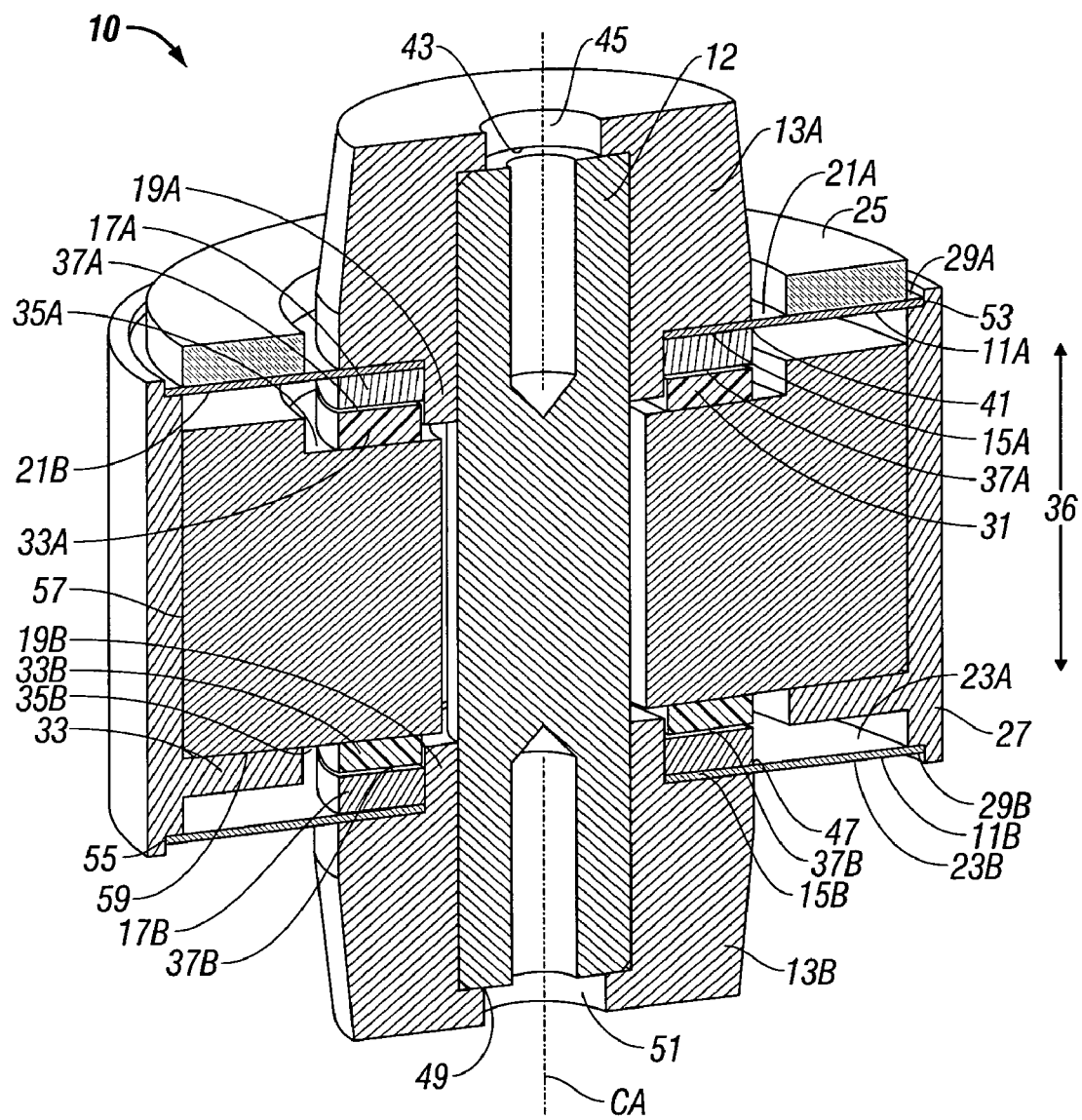

FLEXURAL DISC FIBER OPTIC SENSOR AND METHOD OF FORMING SAME

BACKGROUND OF THE INVENTION

1. Field of the Invention

This invention relates broadly to fiber optic sensors for measuring linear acceleration. More particularly, this invention relates to fiber optic sensors that employ an optical fiber coil affixed to a flexural disc.

2. Description of Related Art

The flexure or strain of an optical fiber coil affixed to a flexible disc is a well-known basis for measuring acceleration resulting from momentum forces acting on the disc in a direction normal to the disc. The amount of flexure is determined interferometrically, where interferometric measurements of strain in the optical fiber coil provide high resolution, high data rates, require low power, are immune to electromagnetic interference, and can readily be adapted for remote sensing and/or rugged applications.

The mass which provides the inertia, and hence the force to cause flexure of the disc, usually consists of the disc itself and the optical fiber coil affixed thereto. This mass is typically small. As a result, the sensitivity of the strain measurements is poor although the frequency response extends to high frequency. Additional mass can be coupled to the disc in order to improve the sensitivity of the strain measurements at the expense of frequency response. For example, U.S. Pat. Nos. 6,384,919 and 5,369,485 each describe a flexural disc fiber optic sensor having a center-supported flexural disc with additional mass that is affixed to the outer edge of the disc and disposed outside the outer circumference of the disc. US Patent Application 2005/0115320 describes a flexural disc fiber optic sensor having a center-supported flexural disc with additional mass that is affixed to the outer edge of the disc and disposed above and below the outer portion of the disc. Such additional mass improves the sensitivity of the device, but makes the device more susceptible to damage from high-g shocks.

U.S. Pat. No. 6,650,418 describes an edge-supported flexural disc that employs viscoelastic shear and compression dampers. The shear damper is in contact with the inner edge portion of the disc. The compression dampers are compressed against the fiber optic coils affixed above and below the disc. The compression dampers act to dampen extreme motions of the disc that would be otherwise caused in the disc, for example, as a result of high-g shocks. In this manner, the compression dampers protect the device against damage from such extreme motion. Disadvantageously, the shear and compression dampers of the '418 patent are difficult to manufacture at small tolerances, and thus are impractical in applications requiring significant proof mass for high sensitivity measurements.

Thus, there remains a need in the art for flexural disc fiber optic sensors that are suitable for applications requiring high sensitivity measurements while affording protection from high-g shocks that may be experienced by the sensors.

BRIEF SUMMARY OF THE INVENTION

The invention provides a flexural disc fiber optic sensor that is suitable for applications requiring high sensitivity measurements while affording protection from high-g shocks that may be experienced by the sensors.

The invention also provides a flexural disc fiber optic sensor that can be manufactured at small tolerances, and thus is suitable for applications requiring high sensitivity measurements.

The invention further provides a flexural disc fiber optic sensor that has a compact design suitable for installation in a borehole that traverses an oilfield.

Accordingly, as discussed in detail below, the fiber optic sensor of the present invention employs at least two flexural discs that are spaced apart from one another along a central axis. A fiber optic coil is affixed to one of the flexural discs. A proof mass is disposed between the flexural discs. A first stop member is disposed between the proof mass and one flexural disc. A second stop member is disposed between the proof mass and the other flexural disc. The first and second stop members are sized to provide space between the proof mass and the corresponding flexural disc to allow for normal motion of the flexural discs, while interfering with movement of the flexural discs to prohibit unwanted extreme motion.

In the preferred embodiment, the stop members are made of a thermoplastic material and formed by a self-aligned process that provides for accurate sizing of the stop members at small dimensions (e.g., dimensions that provide for operating gaps less than 25 µm).

In the preferred embodiment, radially inner portions of the flexural discs are rigidly connected to a central support structure and radially outer edge portions of the flexural discs are rigidly connected together and to the proof mass.

The fiber optic sensor can be used for Optical Time Domain Reflectometry (OTDR) measurements of acceleration over spaced-apart locations in a fiber optic waveguide, which can be installed in a borehole that traverses an oilfield for real-time oilfield monitoring applications. Such OTDR measurement can also be used in fiber-based interferometric measurement applications.

Additional advantages of the invention will become apparent to those skilled in the art upon reference to the detailed description taken in conjunction with the provided figures.

BRIEF DESCRIPTION OF THE DRAWING

FIG. 1 is a cross-section schematic view of a fiber optic sensor in accordance with the present invention.

DETAILED DESCRIPTION OF THE INVENTION

Turning now to FIG. 1, a fiber optic sensor 10 according to the present invention includes a top flexural disc 11A and a bottom flexural disc 11B that are rigidly attached to a central support structure (e.g., the center post 12 and corresponding central support members 13A, 13B). In the preferred embodiment, the radially inner portion 15A of the top flexural disc 11A is permanently affixed between the central support member 13A and a backing disc 17A by welding, adhesive material, or other suitable means (for example, by welding along the interface 41 through the radially inner portion 15A of the top flexural disc 11A to the central support member 13A). The backing disc 17A interfaces to an annular flange portion 19A of the central support member 13A. The central support member 13A is rigidly attached to the center post 12 by welding, adhesive material, or other suitable means (for example, by welding along an interface 43 that is exposed by a cutout 45 in the top wall of the central support member 13A).

Similarly, the radially inner portion 15B of the bottom flexural disc 11B is permanently affixed between the central support member 13B and a backing disc 17B by welding, adhesive material, or other suitable means (for example, by welding along the interface 47 through the radially inner portion 15B of the bottom flexural disc 11B to the central support member 13B). The backing disc 17B interfaces to an annular flange portion 19B of the central support member 13B. The central support member 13B is rigidly attached to the center post 12 by welding, adhesive material, or other suitable means (for example, by welding along an interface 49 that is exposed by a cutout 51 in the bottom wall of the central support member 13B). In this configuration, the top and bottom flexural discs 11A, 11B are centrally supported by rigid attachment to the central support structure (members 13A, 13B and the center post 12) such that the top and bottom flexural discs 11A, 11B are axially-aligned to one another.

The top flexural disc 11A has a top surface 21A opposite a bottom surface 21B. Similarly, the bottom flexural disc 11B has a top surface 23A opposite a bottom surface 23B. A fiber optic coil 25 is affixed to the top surface 21A of the top flexural disc 11A by adhesive material or other suitable means. For simplicity of illustration, the fiber optic coil 25 is indicated as a solid component. However, it should be understood that the fiber optic coil 25 is a multi-layer spiral-wound coil that may be formed in accordance with well-known techniques for forming such coil.

An outer edge coupler 27 extends between the radially outer edge portions 29A, 29B of the flexural discs 11A, 11B and is rigidly attached thereto by welding, adhesive material, or other suitable means (for example, welding at interfaces 53, 55) such that the radially outer edge portions 29A, 29B of the top and bottom flexural discs 11A, 11B are rigidly connected together. A proof mass 31, which is preferably made of tungsten, is rigidly attached to the outer edge coupler 27 and is disposed in the space between bottom surface 21B of the top flexural disc 11A and the top surface 23A of the bottom flexural disc 11B. Preferably, the outer edge coupler 27 includes a flange 33 that extends radially inward between the two flexural discs 11A, 11B. The proof mass 31 is supported by the flange 33 in the space between bottom surface 21B of the top flexural disc 11A and the top surface 23A of the bottom flexural disc 11B. The proof mass 31 is rigidly attached to the flange 33 by adhesive material, welding, or other suitable means (for example, by adhesive material at the interfaces 57, 59). In this manner, the proof mass 31 is rigidly connected by the outer edge coupler 27 to the radially outer edge portions 29A, 29B of the flexural discs 11A, 11B. The additional mass provided by the outer-edge-coupled proof mass 31 improves the sensitivity of the device in response to axial acceleration forces and the strain measurements based thereon.

The fiber optic coil 25 of the fiber optic sensor 10 is optically coupled (preferably by a splice or other suitable means) to a fiber optic waveguide for interferometric measurements of strain and acceleration based thereon.

During operation, acceleration forces along the central axis CA cause the radially outer edge portions 29A, 29B of the two flexural discs 11A, 11B together with the proof mass 31 to move together in a direction parallel to the central axis (denoted by arrow 36) relative to radially inner portions 15A, 15B of the two flexural discs 11A, 11B and the center support structure (central support members 13A, 13B and center post 12).

High-g force loading can potentially induce extreme motion in the two flexural discs 11A, 11B and thus damage the fiber optic sensor. In order to prevent such extreme motion, the fiber optic sensor 10 employs a top end-stop ring 33A and a bottom end-stop ring 33B. The top end-stop ring 33A is disposed between the bottom surface 21B of top flexural disc 11A and proof mass 31. Similarly, the bottom end-stop ring 33B is disposed between the top surface 23A of the bottom flexural disc 11B and proof mass 31. The top and bottom end-stop rings 33A, 33B are made of a thermoplastic material and sized by a self-aligned process that ensures sufficient and accurate gaps are provided adjacent the end-stop rings 33A, 33B. Such gaps allow for unhindered flexing movement of the flexural discs 11A, 11B during normal operation. However, under extreme g-force loading, the end-stop rings 33A, 33B interfere with flexing movement of the top and bottom flexural discs to preclude unwanted extreme motion of the top and bottom flexural discs.

In the self-aligned process, the end-stop rings 33A, 33B are initially assembled in a compressed state and then heated to a temperature above their heat-deflection temperature, which is the temperature at which permanent deformation is taking place at the given compressed state. The end-stop rings 33A, 33B are then allowed to cool. Such cooling causes shrinkage of the dimensions of the respective end-stop rings 33A, 33B, and thus, with appropriate time and temperature, the appropriate gaps adjacent thereto form.

In the preferred embodiment, the top end-stop ring 33A is disposed between the backing disc 17A and a top annular cut out surface 35A of the proof mass 31, and the bottom end-stop ring 33B is disposed between the backing disc 17B and a bottom annular cut out surface 35B of the proof mass 31. The self-aligned process forms gaps 37A, 37B adjacent to the corresponding end-stop rings 33A, 33B. The end-stop rings 33A, 33B can be attached to the corresponding backing discs 17A, 17B by use of an adhesive, mechanical fixing, or other suitable means. In this configuration, the gaps will be disposed between the corresponding end-stop rings and the proof mass (not shown). Alternatively, the end-stop rings 33A, 33B can be attached to the proof mass 31 by use of an adhesive, mechanical fixing, or other suitable means. In this configuration, the gaps will be disposed between the corresponding backing discs and the end-stop rings as shown. In yet another alternative, the end-stop rings 33A, 33B can be allowed to float in the space between the backing discs 17A, 17B and the proof mass 31. In this configuration, the gaps can be on either the top or bottom sides of the end-stop rings 33A, 33B.

In the preferred embodiment, the two end-stop rings 33A, 33B are made of a low friction, high temperature thermoplastic material. The thicknesses of these rings are arranged such that they are slightly oversized relative to the space available between the backing discs 17A, 17B (which are rigidly connected to the center post 12) and the proof mass 31, after accounting for the machining tolerances of these parts (typically on the order of ±0.05 mm). This represents a tight but easily achievable machining tolerance with modern machinery.

The apparatus is assembled. In this initial assembly, the end-stop rings 33A, 33B are compressed due to their oversized thickness dimensions. The assembly is then heated to a temperature above the heat deflection temperature for the end-stop rings 33A, 33B, which causes the thermoplastic material of the end-stop rings 33A, 33B to soften markedly. Consider an example where the end stop rings are made of PTFE and sized to induce compression forces of 1.8 MPa upon initial assembly. The heat-deflection temperature for PTFE at 1.8 MPa is approximately 55° C. Thus, by heating the initial assembly to a temperature in the range between 150° C. and 200° C., the PTFE end-stop rings 33A, 33B will soften and deform to a point where the end stop rings 33A, 33B completely fill the spaces between the backing discs 17A, 17B and the proof mass 31. In this configuration, motion of the proof mass 31 and flexural discs 11A, 11B relative to the central support structure is inhibited. The assembly is then allowed to cool. Such cooling causes shrinkage of the dimensions of the respective end-stop rings 33A, 33B, and thus forms the appropriate gaps adjacent thereto.

Such shrinkage can be controlled by analysis of the thermal expansion coefficients of the materials of the parts of the assembly, the dimensions of such parts, and the heating and cooling temperatures used in the self-aligned processing. For example, consider the following example:

the center post 12 is made of a material with a thermal expansion coefficient of approximately 13 ppm/° C. and has a length of 10 mm;

the end-stop rings 33A, 33B are made of PTFE having a thermal expansion coefficient of approximately 100 ppm/° C. and each have a thickness of 1 mm;

the proof mass is made of tungsten having a thermal expansion coefficient of 4.5 ppm/° C. and has a thickness between surfaces 35A and 35B of 8 mm; and the initial assembly is heated to a temperature of 200° C. and cooled to a temperature of 25° C.

In this example, the following calculations can be made. The shrinkage of the center post 12 can be calculated as 10 mm*13 ppm/° C.*175° C.=22.8 μm. The shrinkage of the proof mass 31 can be calculated as 8 mm*4.5 ppm/° C.*175° C.=6.3 μm. The total shrinkage of the end-stop rings 33A, 33B is calculated as 2*1 mm*100 ppm/° C.*175° C.=35 μm. Hence, the net total shrinkage is calculated as the shrinkage of the proof mass 31 added to the shrinkage of the end-stop rings 33A, 33B less the shrinkage of the center post 12, which is (6.3+35−22.8) μm=18.5 μm. This net shrinkage is divided by 2 to give the net shrinkage per end-stop ring of 9.3 μm, assuming zero-stress state at 200° C. In this manner, a gap on the order of 10 μm can be realized by the self-aligned process described herein. Smaller gaps (e.g., in the range between 5 to 10 μm per end-stop ring) can be formed by similar materials and methods. Advantageously, the self-aligned process described herein forms a simple, reliable method to form a small gap for the end-stop rings of the sensor. Such gaps would otherwise prove extremely difficult to manufacture.

The thermoplastic material used for the end-stop rings 33A, 33B must have an appropriate expansion coefficient to develop the required gap, and must also survive repeated high-g shocks at a defined upper temperature. Although PTFE is described above, there are a number of thermoplastic materials that can be used, including using glass-fiber/carbon-filled PTFE, PFA, FEP, PEEK, or various other high temperature plastics.

The flexural discs 11A, 11B are preferably formed of a structural material such as alloys of aluminum, nickel, iron, or copper. The fiber optic sensor 10 is typically mounted inside a protective housing (not shown) that is suitable for the desired application. The housing may be formed of any suitable material, such as plastics or metal, that will allow sufficient structural stiffness to ensure that structural resonance frequencies are far from the frequency range of interest. The housing may be manufactured by any suitable means such as machining or casting.

Advantageously, the flexural disc fiber optic sensor of the present invention utilizes a proof mass that is edge-coupled to two flexural discs and thus affords improved sensitivity. The end stops protect the device from high-g shocks that may be experienced by the sensor due to its increased mass. Moreover, the self-aligned process for sizing the end stops provides a cost-effective solution that allows for the small tolerances required for high sensitivity measurements. Finally, the flexural disc fiber optic sensor has a compact design suitable for installation in a borehole that traverses an oilfield, as well as for other optical fiber-based interferometric measurement applications.

There have been described and illustrated herein embodiments of a flexural disc fiber optic sensor. While particular embodiments of the invention have been described, it is not intended that the invention be limited thereto, as it is intended that the invention be as broad in scope as the art will allow and that the specification be read likewise. Thus, while a particular self-aligned process has been disclosed for sizing the end stops of the sensor, it will be appreciated that other methodologies can be used as well. In addition, while a particular sensor design has been disclosed, it will be understood that other designs can be used. Also, while the fiber optic sensor is described as part of particular OTDR methodologies and systems, it will be recognized that it can readily be used in other OTDR methodologies and systems and well as in other optical fiber-based interferometric methods and systems. Moreover, while particular materials and thermal processing parameters have been disclosed in reference to the self-aligned process for forming the end stops, it will be appreciated that other material and thermal processing parameters could be used as well. It will therefore be appreciated by those skilled in the art that yet other modifications could be made to the provided invention without deviating from its scope as claimed.

What is claimed is:

1. A fiber optic sensor comprising:
   first and second flexural discs that are spaced apart from one another along a central axis;
   a fiber optic coil affixed to one of said first and second flexural discs;
   a proof mass disposed between said first and second flexural discs;
   a first stop member, disposed between said proof mass and said first flexural disc, said first stop member sized to i) provide space between said proof mass and said first flexural disc to allow for normal motion of the first flexural disc, and ii) interfere with movement of said first flexural disc to prohibit unwanted extreme motion of said first flexural disc; and
   a second stop member, disposed between said proof mass and said second flexural disc, said second stop member sized to i) provide space between said proof mass and said second flexural disc to allow for normal motion of the second flexural disc, and ii) interfere with movement of said second flexural disc to prohibit unwanted extreme motion of said second flexural disc; and
   wherein said fiber optic sensor includes only a single fiber optic coil.

2. A fiber optic sensor according to claim 1, wherein said proof mass is rigidly connected to corresponding portions of said first and second flexural discs.

3. A fiber optic sensor according to claim 2, further comprising an outer edge coupler that is rigidly attached to radially outer edge portions of said first and second flexural discs, wherein said proof mass is attached to said outer edge coupler.

4. A fiber optic sensor according to claim 3, wherein said outer edge coupler is welded to said radially outer edge portions of said first and second flexural discs.

5. A fiber optic sensor according to claim 3, wherein said proof mass comprises a tungsten body attached to said outer edge coupler by an adhesive.

6. A fiber optic sensor according to claim 2, wherein radially inner portions of said first and second flexural discs are rigidly attached to a central support structure.

7. A fiber optic sensor according to claim 6, wherein said radially inner portions of said first and second flexural discs are welded to said central support structure.

8. A fiber optic sensor according to claim 1, wherein said first and second stop members are made of a thermoplastic material.

9. A fiber optic sensor according to claim 1, wherein:
said first stop member is sized to provide a first operating gap between said proof mass and said first flexural disc, said first operating gap being less than 25 μm wide along a direction parallel to the central axis, and
said second stop member is sized to provide a second operating gap between said proof mass and said second flexural disc, said second operating gap being less than 25 μm wide along a direction parallel to the central axis.

10. A fiber optic sensing system comprising:
an optical fiber waveguide; and
at least one fiber optic sensor of claim 1 integrated inline with said optical fiber waveguide.

11. An oil field monitoring system comprising the fiber optic sensing system of claim 10 deployed in a borehole that traverses an oilfield.

12. A method of forming a fiber optic sensor including:
a) providing an assembly including
  i) first and second flexural discs that are spaced apart from one another along a central axis,
  ii) a proof mass disposed between said first and second flexural discs;
  iii) a first stop member, disposed between said proof mass and said first flexural disc, said first stop member made of a thermoplastic material and oversized such that it exists in a compressed state, and
  iv) a second stop member, disposed between said proof mass and said second flexural disc, said second stop member made of a thermoplastic material and oversized such that it exists in a compressed state,
b) heating said assembly to a temperature above the heat deflection temperature of the thermoplastic material of the first and second stop members;
c) cooling the first and second stop members, whereby such cooling shrinks said first stop member to form a first space between said proof mass and said first flexural disc to allow for normal motion of the first flexural disc and also shrinks said second stop member to form a second space between said proof mass and said second flexural disc to allow for normal motion of the second flexural disc.

13. A method according to claim 12, wherein:
said first stop member interferes with flexing movement of said first flexural disc to preclude unwanted extreme motion of said first flexural disc; and
said second stop member interferes with flexing movement of said second flexural disc to prohibit unwanted extreme motion of said second flexural disc.

14. A method according to claim 12, further comprising affixing a fiber optic coil to one of said first and second flexural discs.

15. A method according to claim 12, further comprising rigidly connecting said proof mass to corresponding portions of said first and second flexural discs.

16. A method according to claim 15, wherein said assembly includes an outer edge coupler that is rigidly attached to radially outer edge portions of said first and second flexural discs, wherein said proof mass is attached to said outer edge coupler.

17. A method according to claim 16, further comprising welding the outer edge coupler to said radially outer edge portions of said first and second flexural discs.

18. A method according to claim 16, wherein said proof mass comprises a tungsten body that is attached to said outer edge coupler by an adhesive.

19. A method according to claim 12, further comprising rigidly attaching radially inner portions of said first and second flexural discs to a central support structure.

20. A method according to claim 19, further comprising welding said radially inner portions of said first and second flexural discs to said central support structure.

21. A method according to claim 12, wherein said first and second spaces are each less than 25 μm wide along a direction parallel to the central axis.

* * * * *